United States Patent
Streebin et al.

(10) Patent No.: US 12,136,058 B2
(45) Date of Patent: Nov. 5, 2024

(54) SYSTEM AND METHOD FOR OBJECT SHIPPING AUTOMATION

(71) Applicant: Simpler Postage, Inc., Lehi, UT (US)

(72) Inventors: Jarrett Streebin, Lehi, UT (US); Paul Vinuelas, Lehi, UT (US); Sawyer Bateman, Lehi, UT (US)

(73) Assignee: Simpler Postage, Inc., Lehi, UT (US)

( * ) Notice: Subject to any disclaimer, the term of this patent is extended or adjusted under 35 U.S.C. 154(b) by 0 days.

(21) Appl. No.: 18/134,992

(22) Filed: Apr. 14, 2023

(65) Prior Publication Data

US 2023/0252396 A1  Aug. 10, 2023

Related U.S. Application Data

(63) Continuation of application No. 16/661,871, filed on Oct. 23, 2019, now Pat. No. 11,657,359, which is a (Continued)

(51) Int. Cl.
*G06Q 10/0831* (2023.01)
*B64C 39/02* (2023.01)
(Continued)

(52) U.S. Cl.
CPC ....... *G06Q 10/0831* (2013.01); *B64C 39/024* (2013.01); *G01G 19/005* (2013.01);
(Continued)

(58) Field of Classification Search
CPC ......... G06Q 10/0831; G06Q 10/08345; G06Q 40/08; G06T 7/62; G06T 7/521;
(Continued)

(56) References Cited

U.S. PATENT DOCUMENTS 5,777,746 A    7/1998 Dlugos
6,721,762 B1   4/2004 Levine et al.
(Continued)

FOREIGN PATENT DOCUMENTS

WO    2013162755 A1    10/2013

OTHER PUBLICATIONS

Bob, "Regular Expression patterns for Tracking number", Stackoverflow, https://web.archive.org/web/20130415050936/https://stackoverflow.com/questions/619977/regular-expression-patterns-for-tracking-numbers, Apr. 15, 2013, retrieved Apr. 14, 2022 (Year: 2013).
(Continued)

*Primary Examiner* — Paul Danneman
(74) *Attorney, Agent, or Firm* — Jeffrey Schox; Diana Lin

(57) ABSTRACT

Embodiments of a system and method for automating shipping for a physical object can include an object dimensions measurer (ODM) operable to collect and wirelessly transmit a dimensions dataset for the physical object, an object weight measurer (OWM) operable to collect and wirelessly transmit a weight dataset for the physical object, and a shipping automation system operable to receive datasets from the ODM and the OWM, implement a compatibility rule facilitating standardization of requirements for service levels provided by shipping carriers, determine object characteristics for the physical object, determine object characteristic specifications required by the service levels, and determine a service level for the physical object based on the object characteristics and the object characteristic specifications.

19 Claims, 9 Drawing Sheets

Related U.S. Application Data continuation of application No. 15/429,039, filed on Feb. 9, 2017, now Pat. No. 10,489,739, which is a continuation-in-part of application No. 14/481,078, filed on Sep. 9, 2014, now Pat. No. 10,671,966.

(60) Provisional application No. 62/340,788, filed on May 24, 2016, provisional application No. 61/879,608, filed on Sep. 18, 2013.

(51) Int. Cl.

| | | |
|---|---|---|
| *G01G 19/00* | (2006.01) | |
| *G06F 30/00* | (2020.01) | |
| *G06K 15/02* | (2006.01) | |
| *G06N 3/04* | (2023.01) | |
| *G06Q 10/0834* | (2023.01) | |
| *G06Q 40/08* | (2012.01) | |
| *G06T 7/521* | (2017.01) | |
| *G06T 7/62* | (2017.01) | |
| *G06T 17/30* | (2006.01) | |
| *H04N 1/00* | (2006.01) | |
| *B64U 101/60* | (2023.01) | |

(52) U.S. Cl.
CPC .......... *G06F 30/00* (2020.01); *G06K 15/024* (2013.01); *G06K 15/1819* (2013.01); *G06N 3/04* (2013.01); *G06Q 10/08345* (2013.01); *G06Q 40/08* (2013.01); *G06T 7/521* (2017.01); *G06T 7/62* (2017.01); *G06T 17/30* (2013.01); *H04N 1/00103* (2013.01); *H04N 1/00827* (2013.01); *B64U 2101/60* (2023.01); *G06K 2215/0097* (2013.01); *G06T 2207/10024* (2013.01); *G06T 2207/10028* (2013.01); *H04N 2201/0055* (2013.01)

(58) Field of Classification Search
CPC .......... G06T 17/30; G06T 2207/10024; G06T 2207/10028; G06F 30/00; B64C 39/024; G01G 19/005; G06N 3/04; B64U 201/60; B64U 2101/60; G06K 15/024; G06K 15/1819; G06K 2215/0097
See application file for complete search history.

(56) References Cited

U.S. PATENT DOCUMENTS

| | | | |
|---|---|---|---|
| 6,772,130 B1 | 8/2004 | Karbowski et al. | |
| 6,970,855 B2 | 11/2005 | Das et al. | |
| 7,411,501 B2 | 8/2008 | Austin | |
| 7,483,857 B2 | 1/2009 | Bansal et al. | |
| 7,818,267 B1 * | 10/2010 | Bilibin | G06Q 10/0833 |
| | | | 705/335 |
| 7,844,553 B2 | 11/2010 | Whitehouse | |
| 8,131,654 B2 | 3/2012 | Asano et al. | |
| 8,150,181 B2 | 4/2012 | Bruna et al. | |
| 8,150,781 B2 | 4/2012 | McCall et al. | |
| 8,156,052 B1 | 4/2012 | Lundberg et al. | |
| 8,306,837 B2 | 11/2012 | Eager | |
| 8,311,880 B1 | 11/2012 | Zabriskie et al. | |
| 8,334,773 B2 | 12/2012 | Cova et al. | |
| 8,429,019 B1 | 4/2013 | Yeatts et al. | |
| 8,600,913 B2 | 12/2013 | Williams et al. | |
| 8,626,618 B2 | 1/2014 | Psota et al. | |
| 9,047,607 B1 | 6/2015 | Curial et al. | |
| 9,142,035 B1 | 9/2015 | Rotman et al. | |
| 9,269,065 B2 | 2/2016 | Erie et al. | |
| 9,307,383 B1 | 4/2016 | Patrick | |
| 9,697,548 B1 | 7/2017 | Jaff et al. | |
| 9,953,332 B2 | 4/2018 | Bateman | |
| 10,198,707 B1 | 2/2019 | Bolton et al. | |
| 10,489,739 B2 | 11/2019 | Streebin et al. | |
| 10,553,122 B1 | 2/2020 | Gilboa-Amir et al. | |
| 10,671,966 B2 | 6/2020 | Streebin | |
| 10,824,982 B1 | 11/2020 | Whitehouse et al. | |
| 2002/0032573 A1 | 3/2002 | Williams et al. | |
| 2002/0107785 A1 | 8/2002 | Melchior et al. | |
| 2003/0144971 A1 | 7/2003 | Das et al. | |
| 2003/0200111 A1 | 10/2003 | Damji | |
| 2005/0251330 A1 | 11/2005 | Waterhouse et al. | |
| 2006/0015469 A1 | 1/2006 | Whitehouse | |
| 2006/0041481 A1 | 2/2006 | Stowe | |
| 2006/0202009 A1 | 9/2006 | Austin | |
| 2006/0224398 A1 | 10/2006 | Lakshman et al. | |
| 2008/0109246 A1 | 5/2008 | Russell | |
| 2010/0153309 A1 | 6/2010 | Asano et al. | |
| 2010/0185476 A1 | 7/2010 | Eager | |
| 2011/0050423 A1 | 3/2011 | Cova et al. | |
| 2011/0071954 A1 | 3/2011 | McCall et al. | |
| 2011/0153513 A1 | 6/2011 | Erie et al. | |
| 2012/0123921 A1 | 5/2012 | Black et al. | |
| 2012/0173450 A1 | 7/2012 | McCall et al. | |
| 2013/0096875 A1 | 4/2013 | Daniel | |
| 2013/0124430 A1 * | 5/2013 | Moir | G06Q 10/08345 |
| | | | 705/330 |
| 2013/0198096 A1 | 8/2013 | Lynch et al. | |
| 2013/0262274 A1 | 10/2013 | Hariharan et al. | |
| 2014/0122227 A1 | 5/2014 | Reinshagen | |
| 2014/0300722 A1 | 10/2014 | Garcia | |
| 2014/0330741 A1 | 11/2014 | Bialynicka-Birula et al. | |
| 2014/0351073 A1 | 11/2014 | Murphy et al. | |
| 2015/0019455 A1 | 1/2015 | Hilbush | |
| 2015/0193857 A1 | 7/2015 | Reed et al. | |
| 2015/0348173 A1 * | 12/2015 | Gillen | G06Q 30/0635 |
| | | | 705/26.81 |
| 2018/0073914 A1 * | 3/2018 | McCloskey | G01B 11/022 |
| 2018/0240066 A1 | 8/2018 | Streebin et al. | |
| 2021/0319398 A1 | 10/2021 | Streebin et al. | |

OTHER PUBLICATIONS

Davis, Tony, "What is a WebHook?", webhooks.pbworks.com, https://webhooks.pbworks.com/w/page/13385124/FrontPage, retrieved Mar. 28, 2017, published Jun. 5, 2011., Jun. 23, 2017 00:00:00.0.

Shippo Engineering, "Webhooks, Shipping and Event Notification", Shippo, https://goshippo.com/blog/webhooks-shipping-and-event-notifications/, retrieved Feb. 11, 2022, published Jun. 7, 2016 (Year: 2016).

* cited by examiner

SYSTEM AND METHOD FOR OBJECT SHIPPING AUTOMATION

CROSS-REFERENCE TO RELATED APPLICATIONS

This application is a continuation of U.S. patent application Ser. No. 16/661,871, filed 23 Oct. 2019, which is a continuation of U.S. patent application Ser. No. 15/429,039, filed on 9 Feb. 2017, which is a continuation-in-part of U.S. patent application Ser. No. 14/481,078, filed on 9 Sep. 2014, which claims the benefit of U.S. Provisional Application Ser. No. 61/879,608, filed on 18 Sep. 2013, both of which are incorporated in their entireties by this reference.

U.S. patent application Ser. No. 15/429,039 additionally claims the benefit of U.S. Provisional Application Ser. No. 62/340,788, filed on 24 May 2016, which is incorporated in its entirety by this reference.

TECHNICAL FIELD

This invention relates generally to the shipping services field, and more specifically to new and useful systems and methods for object shipping automation.

BACKGROUND

The shipping services field is incredibly important to people and businesses across the world. Providing efficient shipping and delivery services is a challenging task with many facets. This is especially true for small business operators or other individuals who may need to ship a variety of products of varying size—such as the crafters of websites like Etsy or active sellers of resale marketplaces like eBay.

One of the largest challenges of shipping for such entities can be efficiently packaging and shipping objects—the time required to measure and weigh objects, as well as determine and purchase appropriate packaging and shipping services, and finally pack and ship objects can be prohibitive. Shipping carriers can offer paid packing services at their brick and mortar locations—but such services can come at a high cost. Thus, there is a need in the field of shipping services to create new and useful systems and methods for object shipping automation. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
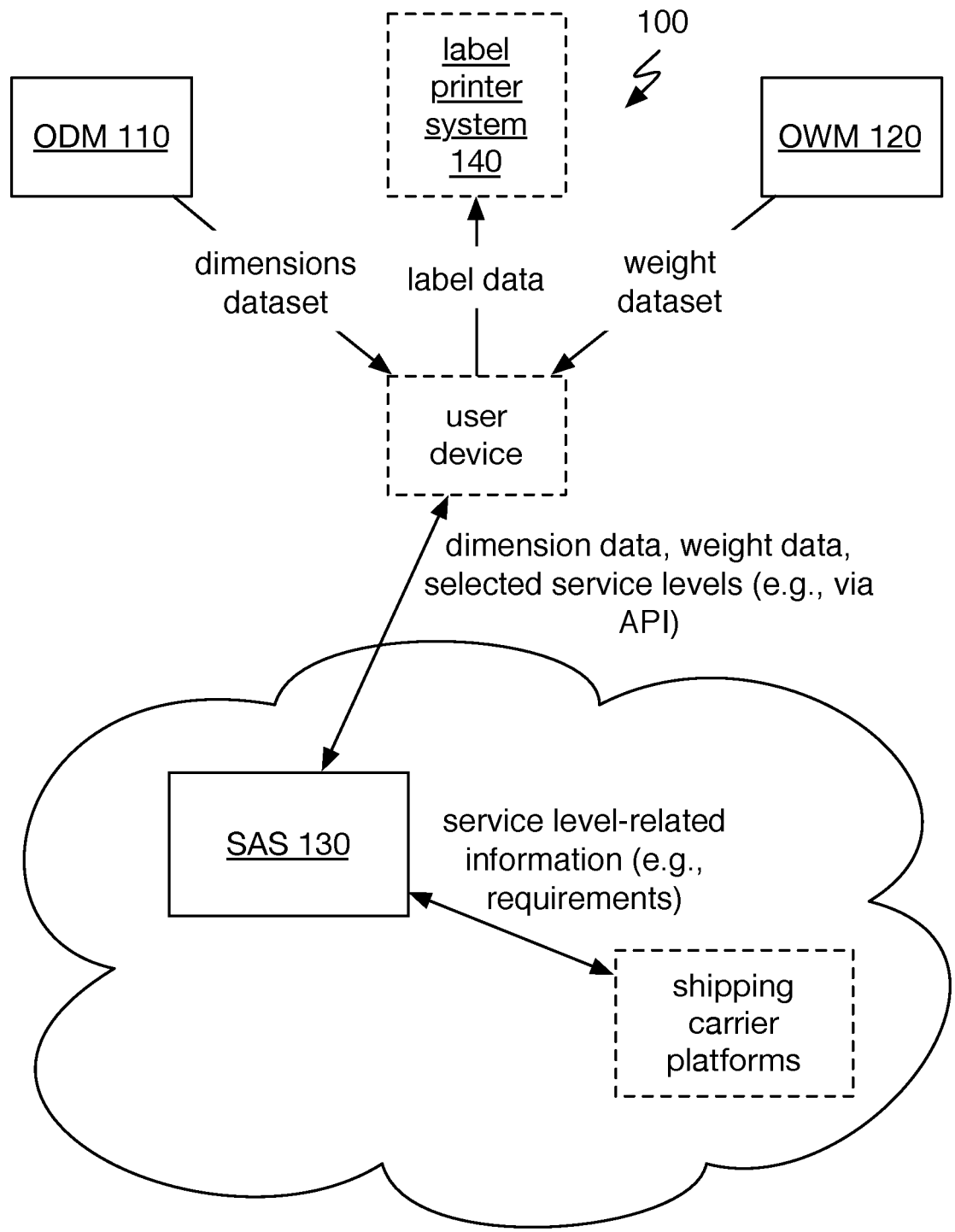
FIG. 1 is a diagram representation of an embodiment of the system.

As shown in FIG. 1, an embodiment of a system 100 for automating shipping for a physical object associated with a user can include: an object dimensions measurer (ODM) operable to collect and wirelessly transmit a dimensions dataset for the physical object; an object weight measurer (OWM) operable to collect and wirelessly transmit a weight dataset for the physical object; and a shipping automation system (SAS) operable to receive datasets from the ODM and the OWM, implement a compatibility rule facilitating standardization of requirements for service levels provided by shipping carriers, determine object characteristics for the physical object, determine object characteristic requirements (e.g., specifications) required by the service levels, and determine a service level (e.g., Next Day Air) for the physical object based on the object characteristics and the object characteristic requirements. The system 100 can additionally or alternatively include a label printer system, a delivery vehicle, and/or any other suitable component.

The system 100 and/or method 200 function to automate shipping logistics determination by enabling the digital collection of object dimensions (via the ODM) and object weight (via the OWM) which can be used by the system 100 to determine viable shipping service levels (e.g., service levels applicable to the object and satisfying user preferences) through communication between the SAS and a plurality of shipping carriers. The system 100 and/or method 200 can additionally or alternatively function to purchase a selected service level, automatically generate and/or print corresponding shipping labels, deliver the object according to a selected service level, and/or provide any other suitable functionality. The system 100 and/or method 200 can additionally or alternatively function in any manner analogous to that described in U.S. patent application Ser. No. 14/481,078, filed 9 Sep. 2014, the entirety of which is incorporated by this reference.

2. Benefits.

The system 100 and method 200 can provide several benefits over traditional shipping systems. First, the technology can automatically integrate dimensional and weight measurements (e.g. from network-connected ODMs and OWMs) to calculate viable service levels and corresponding rate quotes across a plurality of shipping carriers. Additionally or alternatively, the technology can automatically purchase the service level (e.g., based on user preferences); automatically generate a shipping label in response to purchasing the service level; and/or print the shipping label with a label printer system.

Second, the technology can facilitate generation of dimension-associated and/or weight-associated information relevant to shipping parties (e.g., sender, recipient, carrier, etc.), such as dimensions characteristics, weight characteristics, images, 3D models, and/or other characteristics of objects to be shipped and/or shipping materials. Such information can be useful for sales, insurance, record keeping, and/or any other suitable applications.

Third, the technology can confer improvements to the functioning of computer-related technology. In a first example, the technology can amount to an inventive distribution of functionality across a network of one or more: ODMs (e.g., collecting and wirelessly transmitting dimensions datasets for objects associated with a plurality of users, etc.), OWMs (e.g., collecting and wirelessly transmitting weight datasets for the objects associated with the plurality of users, etc.), and shipping automation systems (e.g., receiving the datasets; determining object characteristics for the objects based on the datasets, such as refining and executing a dimensions model for accurately determining object dimensions with the dimensions datasets; determining a viable service level for shipping the object based on comparing the object characteristics to object characteristic requirements for service levels provided by a plurality of shipping carriers, etc.). In a second example, the technology can apply computer-implemented rules (e.g., compatibility rules for standardizing object characteristic requirements for different service levels spanning multiple shipping carriers; object characteristic determination rules for transforming datasets collected by an ODM and/or OWM into dimensions and/or weight characteristics for the object; comparison rules for comparing object characteristics to object characteristic requirements; etc.) in conferring improvements to the computer-related technical field of shipping automation. In a third example, the technology can improve the functioning of shipping logistics systems (e.g., freight logistics, supply chain management systems) by automating the standardization, selection, and/or purchasing of service levels across multiple shipping carriers, thereby reducing the computational processing required by shipping logistics systems (e.g., from having to individually retrieve service levels and associated prices from each different service carrier).

Fourth, the technology can transform a particular article to another state or thing. For example, the technology can transform one or more of: a physical object to be shipped (e.g., transforming from the physical object to a digital representation of the physical object in the form of dimensions, weight, and/or a 3D model based on ODM and/or OWM measurements of the physical object, etc.), a label printer system (e.g., controlling the label printer system to automatically print a shipping label generated by the label printer system or the shipping automation system, etc.), a delivery vehicle (e.g., automatically delivering an object with the delivery vehicle in response to determining an appropriate service level for shipping the object, etc.), and/or any other suitable component. However, the technology can provide any other suitable benefits in the context of using non-generalized systems for object shipping automation.

3.1 System—Object Dimensions Measurer.

The system 100 can include an object dimensions measurer (ODM) 110, which can function to collect and wirelessly transmit a dimensions dataset for a physical object to be shipped. For example, the ODM 110 can collect length, width, and height data for an object and/or a rectangular prism capable of fully enclosing the object.

Figure 2:
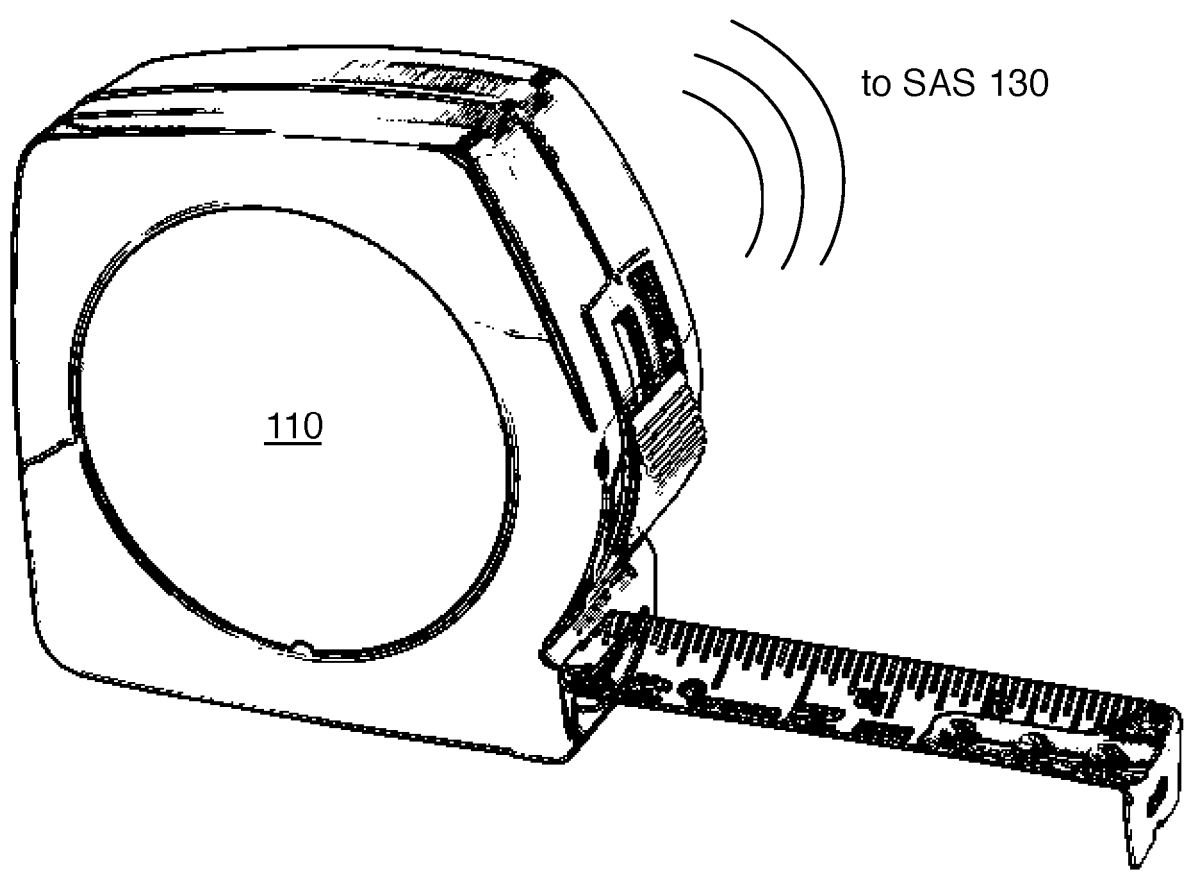
FIG. 2 is an example representation of an object dimensions measurer of a variation of the system.

The ODM 110 preferably includes one or more: sensors, communication modules (e.g., wired, wireless, etc.), and/or any other suitable components enabling the system 100 to estimate, measure, and/or transmit dimensions datasets for one or more objects. As shown in FIG. 2, in an example, the ODM 110 can include an electronic tape measure that communicates measurements to the SAS 130 via a wireless connection (e.g., Bluetooth). In this example, a user interface (e.g., of a user device, of a label printer system 140, of the ODM 110), coupled to the SAS 130 can be used to prompt a user to take measurements of an object (e.g., "please measure the length of the object", "please measure the height of the object", etc.). The measurements taken in response to this prompt can be then stored as measurements of the object with the SAS 130. Additionally or alternatively, measurements can be communicated from the ODM 110 to the SAS 130 in any manner. For example, a bulk set of dimensions datasets can be transmitted from the ODM 110 to the SAS 130, enabling the user to select which dimensions datasets correspond to which objects. Additionally or alternatively, the ODM 110 can include any hand-held distance measurement device (e.g., calipers, a laser rangefinder, an ultrasonic rangefinder). However, the electronic tape measure can be configured in any suitable manner.

In another example, the ODM 110 can include a two- or three-dimensional scanner. In this example, the ODM 110 preferably captures two- or three-dimensional data describing the shape or other characteristics of the object being scanned, but can additionally or alternatively capture any suitable information (e.g., RGB image information, texture information). This two- or three-dimensional data can be used to determine, for instance, the dimensions of an object. Additionally or alternatively, three-dimensional data captured by the ODM 110 can be used to form a 3D model of the object (e.g., for determining a service level, for record-keeping purposes, to aid in the sale of an object, to aid in calculating quotes such as service level rate quotes or insurance quotes, etc.), a 2D image of the object, and/or any other suitable information. In other examples, the ODM 110 can include any one or more of: a contact scanner (e.g., a coordinate measuring machine, a touch probe), a non-contact active scanner (e.g., laser time-of-flight scanner, triangulation-based laser scanner, a structured light scanner), a non-contact passive scanner (e.g., stereoscopic scanner, photometric scanning system, silhouette scanning system), hand-held scanners, free-standing scanners, other suitable scanners capable of capturing 3D information (e.g., a structured-light assisted stereo 3D scanner), and/or any other suitable components. However, the 3D scanner can be configured in any suitable manner.

In another example, the ODM 110 can be an application operable on a multi-purpose user device (e.g., a smartphone, tablet). In this example, the ODM 110 can utilize sensor data of the user device to determine object dimensions. In a specific example, the application can capture images of an object using a camera of the user device and/or inertial sensor data (e.g., accelerometer data). The application can interpret the images in relation to the inertial sensor data to determine dimensions characteristics of the object. This process can be performed automatically and/or with the aid of the user (e.g., selecting the object using an interface of the user device, drawing axes of the object, and/or indicating one or more dimensions of the object using the interface). In another specific example, the ODM 110 can rely solely on inertial sensor data. The ODM 110 can prompt a user to place a phone at one end of an object, and then move the object along one axis (e.g., the length of an object) until the other end of the object. From the resulting inertial measurements, a displacement between the two ends of the object can be determined (e.g., an object dimension). In another specific example, the ODM 110 can rely solely on image data. For example, the ODM 110 can prompt a user to take a picture of an object and then indicate a scale of the image. The ODM 110 can additionally or alternatively request that the user take multiple images from varying views (e.g., one front view, one side view, one top view). Additionally or alternatively, the ODM 110 can be paired with one or more objects of known size, enabling the ODM 110 to automatically determine dimensions of the object. With a single scaling object, the ODM 110 can correct for parallax in one dimension of the 2D image plane; with two scaling objects, the ODM 110 can be able to correct for parallax in both dimensions of the 2D image plane. Additionally or alternatively, parallax can be corrected for using inertial data (or user supplied corrections). However, the application can be configured in any suitable manner The ODM 110 is preferably communicatively coupled to a user device and/or the SAS 130 using a wireless data communication channel (e.g., Wi-Fi, LTE, Bluetooth, Bluetooth Low Energy, 802.15.4, Zigbee), but can additionally or alternatively communicate with a user device and/or SAS 130 in any manner (e.g., wired connection).

The ODM 110 preferably captures dimensions datasets, which can include any one or more of: including raw sensor data (e.g., pixel data of a camera, raw accelerometer data), processed sensor data (e.g., accelerations vs. time, a 3D model), sensor data-derived dimensions (e.g., displacement derived from accelerometer data, distance derived from a 3D model), and/or any other suitable data indicative of dimensions characteristics. Additionally or alternatively, the ODM 110 can be used to collect one or more of: measurements of shipping containers (e.g., to determine what objects fit in said containers); images of an object (e.g., to be used for selling the object, documenting the object, insuring the object, etc.) even if images are not explicitly used to calculate the dimensions of an object, and/or any other suitable data.

Figure 7:
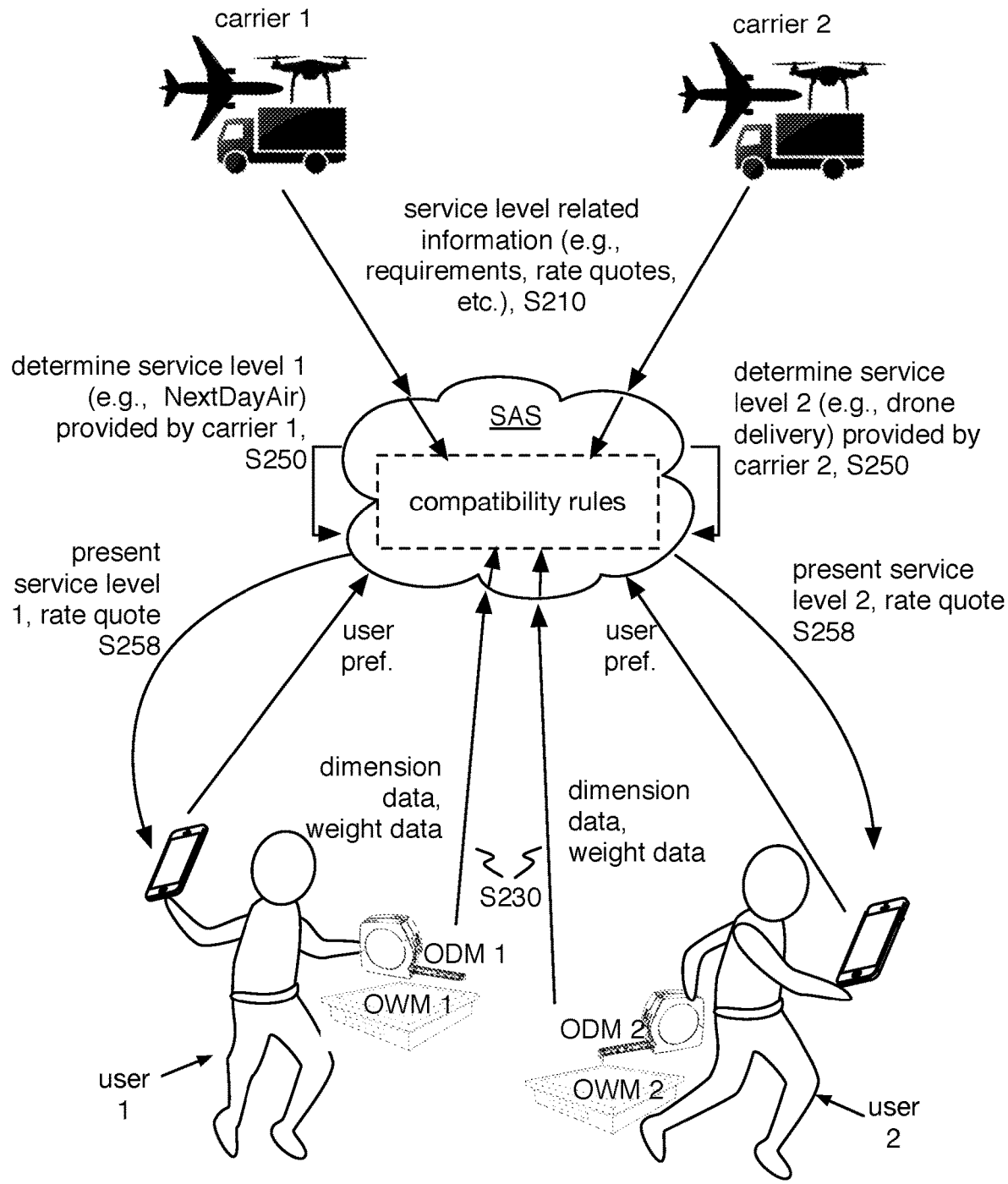
FIG. 7 is a schematic representation of determining service levels for a plurality of users in a variation of the method.

In relation to ODMs 110, as shown in FIG. 7, the system 100 can include any suitable number of ODMs 110 (and/or other types of components, such as OWMs 120) associated with any number of users. In a specific example, the system 100 can include a second ODM 110 (e.g., in addition to a first ODM 110) operable to collect and wirelessly transmit a second dimensions dataset for a second physical object associated with a second user; and a SAS 130 operable to receive the second dimensions dataset from the second ODM 110; determine object characteristics for the second physical object based on the second dimensions dataset (e.g., according to a compatibility rule); and determine a second service level from the service levels for the second physical object based on a direct comparison between the second object characteristics and the object characteristic specifications, where the second service level is different from the first service level. However, the ODM 110 can be configured in any suitable manner.

3.2 System—Object Weight Measurer.

The system 100 can include an object weight measurer (OWM) 120, which functions to collect and wirelessly transmit a weight dataset for a physical object (e.g., to be shipped) and/or other suitable materials (e.g., shipping materials). The OWM 120 is preferably a digital platform scale, but can additionally or alternatively be a digital hanging scale or any device or sensor capable of providing a weight measurement for the object to the SAS 130.

Figure 3:
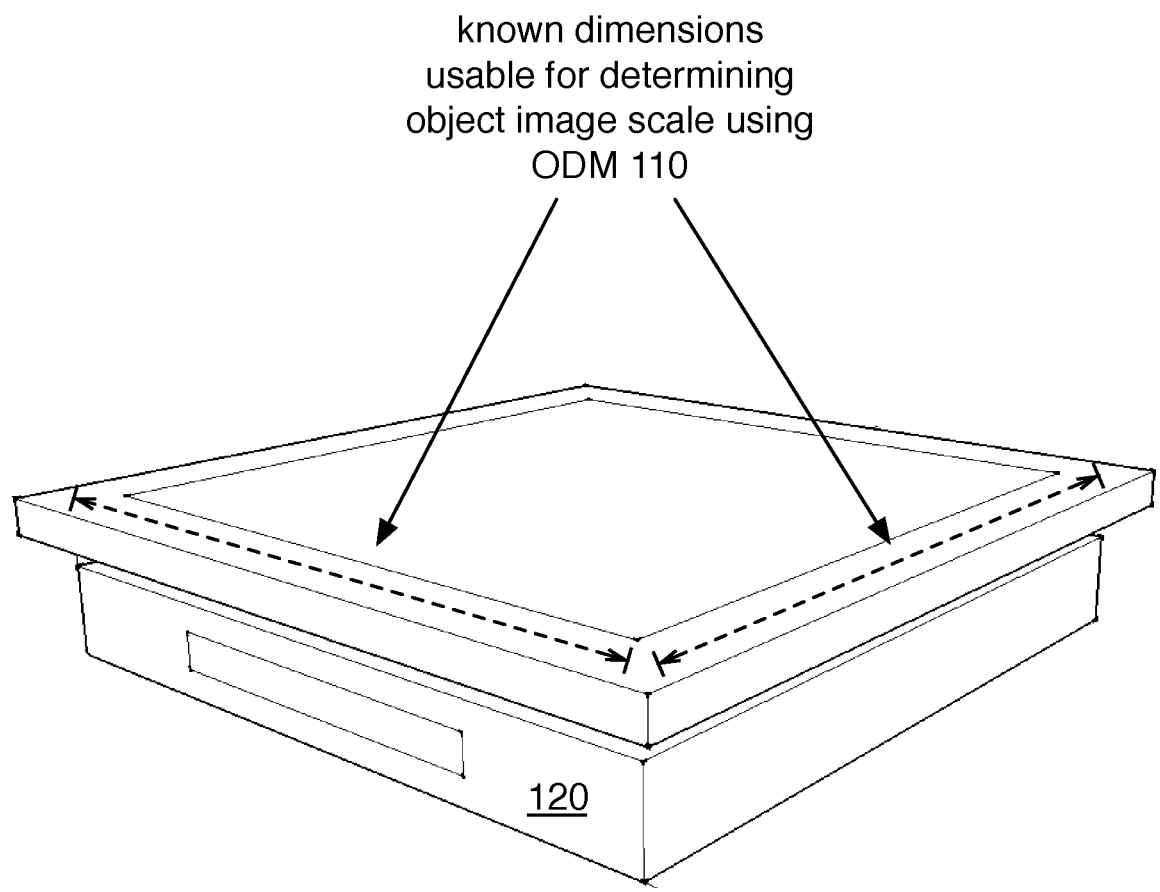
FIG. 3 is an example representation of an object weight measurer of a variation of the system.

In a variation, as shown in FIG. 3, the OWM 120 can include a platform of known size that can be used with the ODM 110 to determine dimensions of an object (e.g., one or more components of the OWM 120 serve as an "object of known size" to help with determining scaling factors for dimensions characteristics). Additionally or alternatively, the OWM 120 can include additional components to aid in this purpose (e.g., a telescoping rod with known diameter can be used to determine the height of an object placed on the OWM 120. In another variation, the OWM 120 can be omitted from the system. In this variation, a weight characteristic for the object can be estimated (e.g., by the SAS and based on a dimensions dataset, based on supplemental datasets such as image datasets and/or user-inputted data, etc.) for use in determining an appropriate service level. Alternatively, a service level can be identified independent of weight characteristics (e.g., determining an appropriate service level and a rate quote based on dimensional weight). Analogous to the ODM 110, the OWM 120 can include a communications module (e.g., wired, wireless) facilitating communicative coupling to user devices, the SAS, and/or any other suitable component. However, the OWM 120 can be configured in any suitable manner.

3.3 System—Shipping Automation System.

The shipping automation system (SAS) 130 functions to collect object datasets (e.g., dimensions datasets, weight datasets), process the object datasets to determine object characteristics (e.g., standardized dimensions characteristics, standardized weight characteristics, etc.), and determine one or more service levels based on comparing object characteristics to object characteristic requirements. The SAS can additionally or alternatively function to purchase service levels, process shipping labels, and/or perform other suitable portions of the method 200. The SAS 130 preferably includes a remote computing system (e.g., associated with a shipping services platform), but can additionally or alternatively include a general-purpose computer, a user device including a microprocessor or microcontroller, and/or any other suitable computing system.

The SAS 130 preferably processes dimensional datasets received from the ODM 110 into object characteristics including three object dimensions (e.g., length, width, height) that describe a rectangular prism bounding box (e.g., the smallest rectangular prism that can enclose an object). Similarly, the SAS 130 can process image data (in light of accelerometer data, or objects of known scale, etc.) to identify an object and/or determine the dimensions of that object. The SAS 130 preferably processes weight datasets from the OWM 120 into weight characteristics. However, the SAS 130 can process object datasets to generate object characteristics in any suitable manner.

The SAS 130 preferably determines one or more service levels based on the object characteristics. Service levels preferably specify the delivery speed (e.g., same day, next day, number of business days, instant, etc.), a mode of transportation (e.g., type of delivery vehicle such as automobile versus aircraft, etc.), and/or other suitable delivery-related information (e.g., delivery success rate, shipping score, etc.). Service levels are preferably provided by a shipping carrier (e.g., USPS, UPS, FedEx, etc.), but can alternatively be independent of a shipping carrier. For example, a service level can be "Next Day Air" provided by UPS. In another example, the shipping carrier can be the entity providing the SAS 130, where the system 100 can include a delivery vehicle for delivering the object according to the selected service level. A service level is preferably associated with a rate quote specifying the cost of shipping the object according to the service level, where the SAS 130 can be operable to identify and/or calculate the rate quote. Alternatively, a service level can be price-independent. However, service levels can be otherwise configured.

The SAS 130 preferably applies one or more computer-implemented rules in determining an appropriate service level (e.g., when determining object characteristics for an object to be shipped, determining object characteristic requirements for service levels provide by shipping carriers, etc.) and/or performing other portions of the method 200. Computer-implemented rules can include any one or more of: a compatibility rule (e.g., a unit standardization rule, a data normalization rule, a suitable object characteristic range rule for determining suitable dimensions and weight ranges for a service level, etc.), object characteristic determination rules (e.g., for transforming datasets collected by an ODM 110 and/or OWM 120 into dimensions and/or weight characteristics for the object), comparison rules (e.g., for comparing object characteristics to object characteristic requirements), service level determination rules (e.g., selecting service levels based on criteria specified by the rules, such as optimizing for shortest delivery speed and/or cheapest rate quote), user preference rules (e.g., established by a user for modifying the service level determination process, etc.), and/or any other suitable rules. Compatibility rules preferably enable direct comparisons between object characteristics for a given object and object characteristic requirements for service levels spanning multiple shipping carriers, in order to identify service levels with requirements (e.g., dimensions requirements, weight requirements, etc.) satisfied by the object to be shipped. However, computer-implemented rules can be otherwise configured. In an example, the SAS 130 determines object characteristics and object characteristic requirements according to processing the appropriate datasets (e.g., dimensions datasets collected by an ODM 110, weight datasets collected by an OWM 120, dimensions requirements and/or weight requirements retrieved from shipping carriers for carrier-provided service levels, etc.) with a unit standardization rule, where the object characteristics and object characteristic requirements share a dimensions unit type and a weight unit type.

The SAS 130 preferably includes storage operable to store computer-implemented rules, identifiers, object characteristics, object characteristic requirements, data requests, associations between the data structures, and/or any other suitable data.

If user interaction is required to collect object datasets, the SAS 130 can additionally or alternatively prompt appropriate user involvement and/or provide feedback to user involvement (e.g., requesting a user to measure an object and providing feedback on the results of those measurements) at a user device, a label printer system 140, and/or other suitable component. However, the SAS can be configured in any suitable manner.

3.4 System—Label Printer System.

Figure 4:
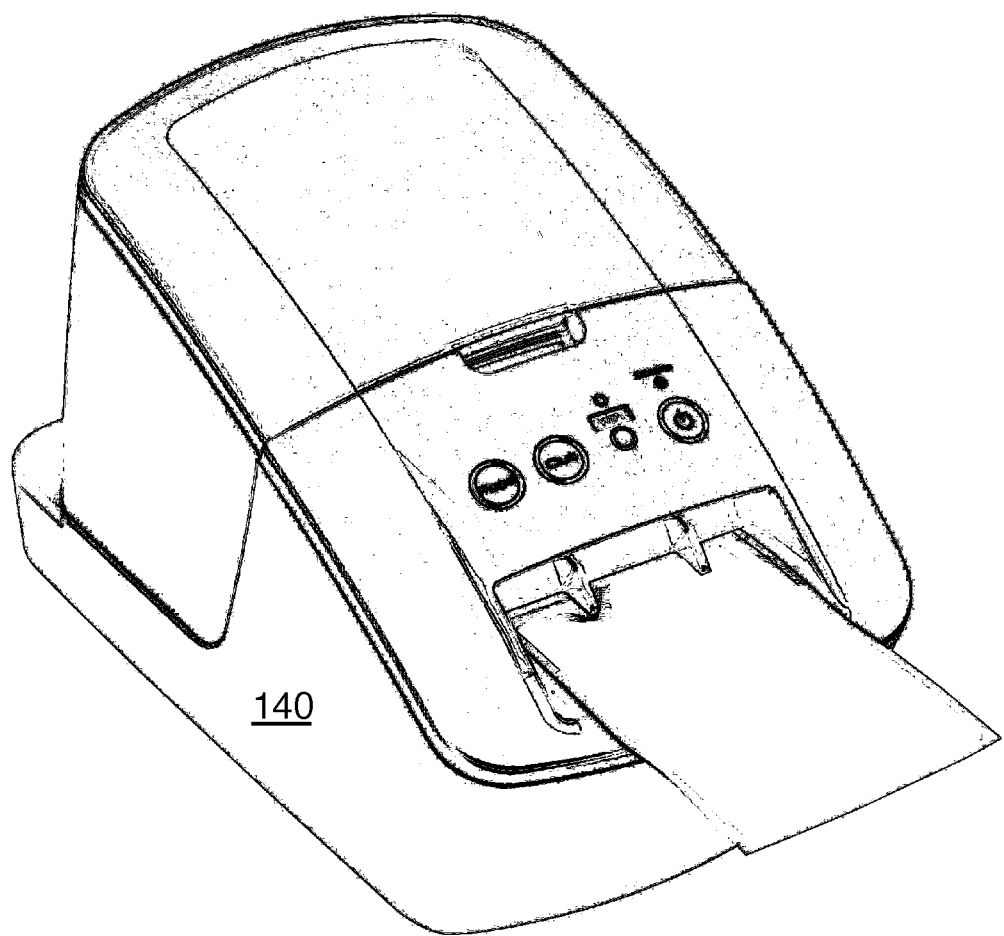
FIG. 4 is an example representation of a label printer system a variation of the system.
Figure 9:
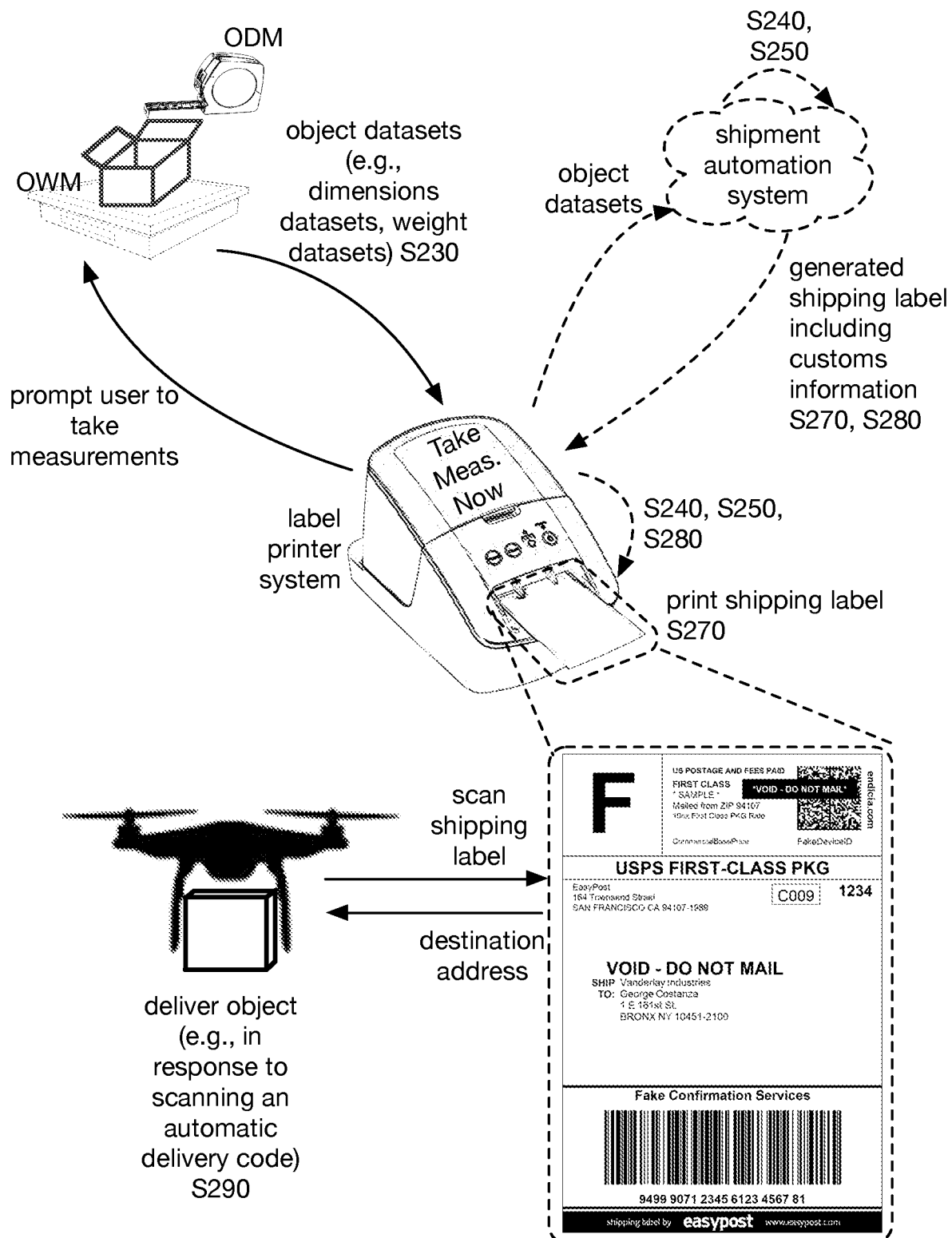
FIG. 9 is a schematic representation of using a label printer system in a variation of the method.

As shown in FIG. 4, the label printer system 140 functions to receive, process, and/or print a shipping label (e.g., automatically generated by the SAS 130 in response to determination of the service level). The label printer system 140 is preferably a roll-fed laser label printer, but can additionally or alternatively be any type of printer (e.g., inkjet printer, dye-sublimation printer, thermal printer, etc.). Additionally or alternatively, the label printer system 140 can include any one or more of a: a user device (e.g., a smartphone, desktop computer, laptop, tablet, etc.), a processing system (e.g., a local processor, a remote computing system, a communications module, etc.), and/or any other suitable component. As shown in FIG. 9, the shipping label preferably identifies an origin address, a destination address, and a corresponding service level (e.g., determined by the SAS 130, but can additionally or alternatively include tracking information (e.g., a tracker code), international customs information (e.g., automatically populated based on the object characteristics) for shipping objects internationally, and/or any other suitable information.

In a first variation, the label printer system 140 can function as a communication hub between ODMs 110, OWMs 120, and a remote SAS 130 (e.g., a remote computing system). For example, the label printer system 140 can be Bluetooth and WiFi enabled, where the label printer system 140 can be operable to receive datasets through Bluetooth from an ODM 110 and/or OWM 120; transmit the datasets to the remote SAS 130 through WiFi; receive and print a shipping label generated by and transmitted from the remote SAS 130; and/or perform other suitable functionality. In a second variation, the label printer system 140 can perform functionality associated with the SAS 130. In this variation, the label printer system 140 can act as a communication hub between ODMs 110, OWMs 120, and shipping carriers. For example, the label printer system 140 can enable a user to automatically obtain a printed shipping label after the user performs a single step of measuring an object with an ODM 110 and/or OWM 120. In another example, the label printer system 140 can include a display operable to prompt the user to collect datasets with the ODM 110 and/or OWM 120; a processing system (e.g., including a processor and a wireless communication module) operable to communicate with an ODM 110 and/or OWM 120 to receive datasets for the object, identify a service level based on comparing object characteristics to object characteristic requirements for service levels, and/or perform any other suitable portion of the method 200; and a printing subsystem operable to print a shipping label automatically generated by the processing system.

The label printer 140 is preferably communicatively coupled to the SAS 130 using a wireless data communication channel (e.g., Wi-Fi, LTE, Bluetooth, Bluetooth Low Energy, 802.15.4, Zigbee), but can additionally or alternatively communicate with the SAS 130 in any manner (e.g., wired). However, the label printer system 140 can include any suitable components configured in any suitable manner.

The system 100 can additionally or alternatively include a delivery vehicle, which functions to deliver one or more objects according to one or more service levels determined by the shipping automation system 130. The delivery vehicle can include any one or more of: automobiles (e.g., freight trucks), railway vehicles (e.g., freight trains), aircraft (e.g., airplanes, delivery drones, etc.), watercraft (e.g., ships, boats, etc.), and/or any other suitable vehicle. The delivery vehicle is preferably a self-controlled vehicle (e.g., self-driving car, self-controlled delivery drone, etc.) operable to receive control instructions (e.g., generated based on a selected service level, generated based on object characteristics derived from a dimensions dataset and/or weight dataset) from the shipping automation system 130 and/or other suitable component, but can alternatively be a user-controlled vehicle. However, the delivery vehicle can be configured in any suitable manner.

While the components of the system 100 are generally described as distinct components, they can be physically and/or logically integrated in any manner. For example, a smartphone application can implement both of the ODM 110 and the SAS 130 (using sensors and processors of the smartphone), while the OWM 120 and label printer system 140 are wirelessly coupled to the smartphone. In another example, the ODM 110, OWM 120, and SAS 130 are integrated into a single enclosure, and the system 100 can be coupled to a label printer system 140 (but does not explicitly include one). However, the system 100 can be configured in any suitable manner.

4. Method.

Figure 5:
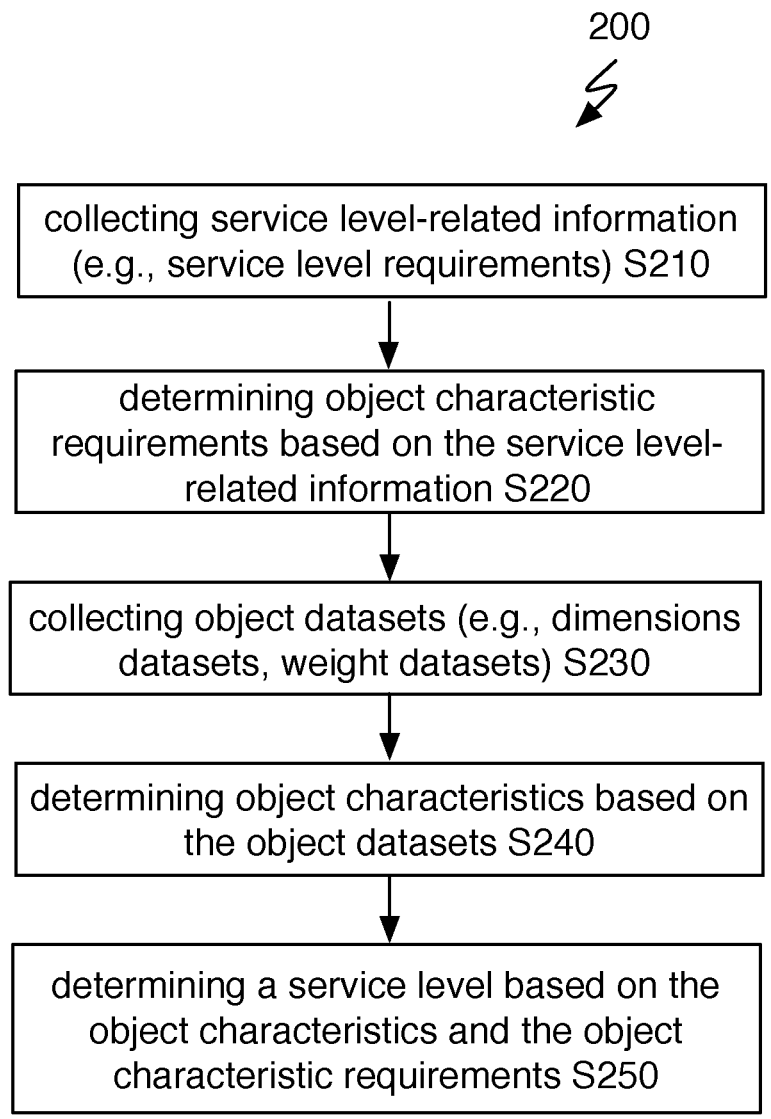
FIG. 5 is a chart representation of an embodiment of the method.
Figure 6:
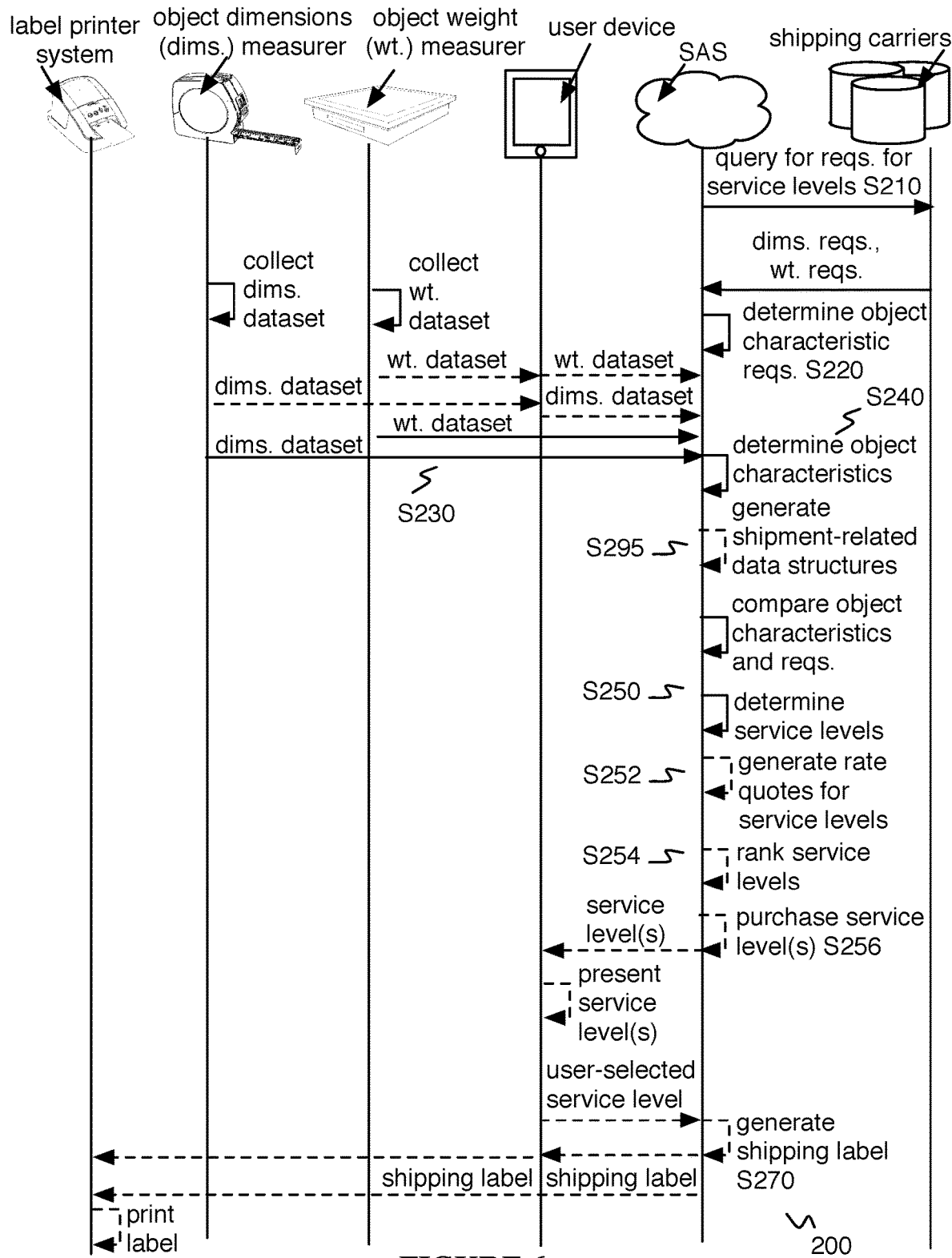
FIG. 6 is a chart representation of an embodiment of the method.

As shown in FIGS. 5 and 6, an embodiment of a method 200 for automating shipping of a physical object associated with a user can include: querying a plurality of shipping carriers for requirements corresponding to service levels provided by the shipping carriers S210; determining object characteristic requirements for the service levels based on processing the service level requirements S220; receiving a dimensions dataset from an ODM and a weight dataset from an OWM S230; determining object characteristics for the object based on processing the dimensions dataset and the weight dataset S240; and determining a service level for the physical object based on a comparison between the object characteristics and the object characteristic requirements S250.

Figure 8:
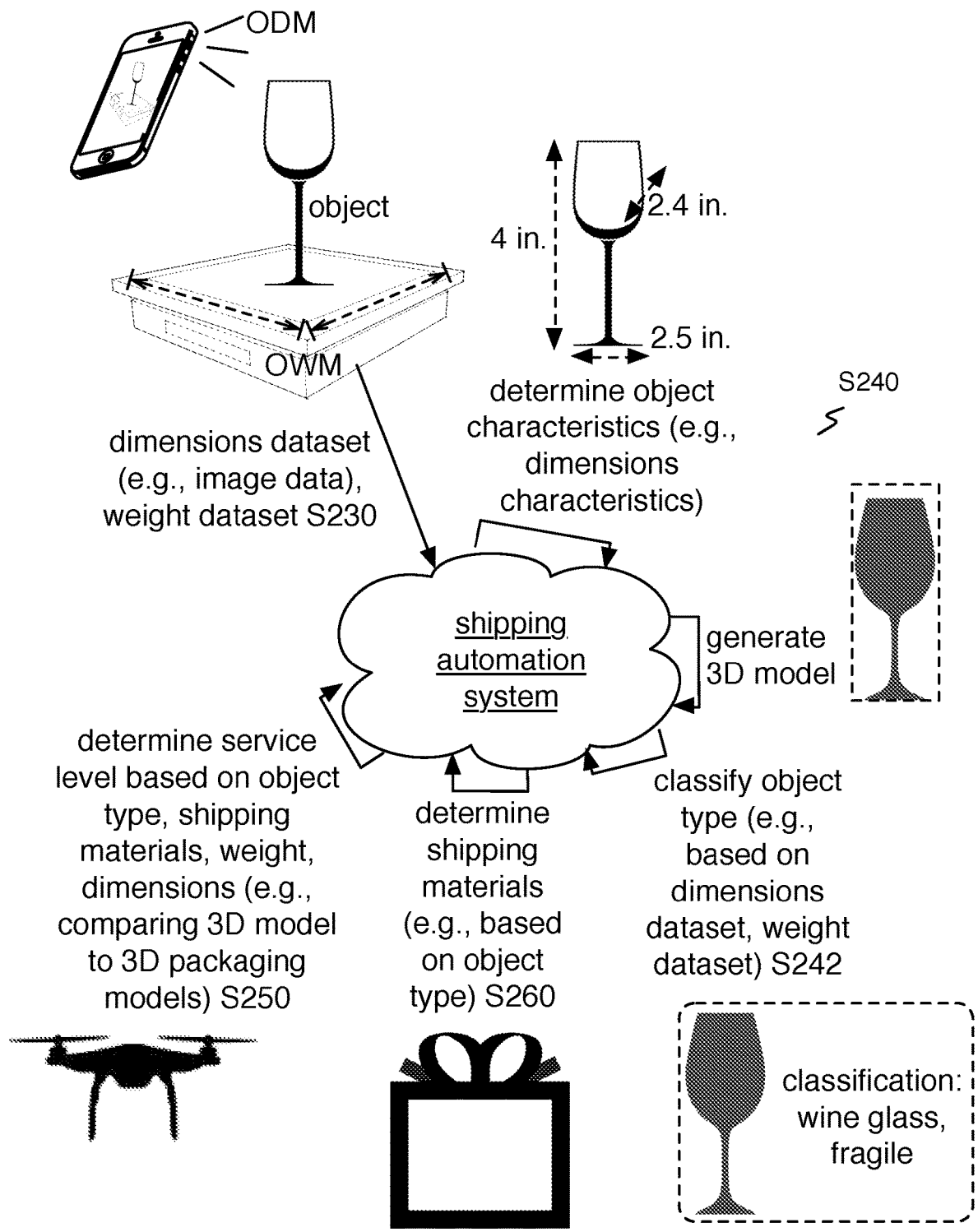
FIG. 8 is a schematic representation of a variation of the method.

As shown in FIG. 8, the method 200 can additionally or alternatively include determining shipping materials based on object characteristics S260; processing a shipping label S270; determining customs information S280; delivering the object S290, generating shipment-related data structures S295, and/or any other suitable functionality. The method 200 is preferably implemented by any suitable combination of components of the system 100 described above, but any portion of the method 200 can be implemented by any suitable component.

4.1 Method—Querying for Service Level Requirements.

Block S210 recites: querying a plurality of shipping carriers for requirements corresponding to service levels provided by the shipping carriers. Block S210 functions to retrieve and/or store requirements for using different service levels provided by different shipping carriers, in order to determine the viability of using the service level to ship an object. Service level requirements preferably include object requirements (e.g., dimensions requirements, weight requirements, object type requirements, and/or other requirements associated with object characteristics), but can additionally or alternatively include any one or more of: delivery speed requirements, mode of transportation requirements, insurance requirements, tracking requirements, rate quote requirements (e.g., minimum and/or maximum cost requirements to use a given service level), and/or any other suitable requirements.

Block S210 preferably includes generating and transmitting data requests for each of the plurality of shipping carriers. The data requests are preferably API requests to APIs associated with platforms of the shipping carriers, but can additionally or alternatively be in a form suited for: non-shipping carrier platforms (e.g., manufacturer databases, distribution center databases, etc.), Internet resources (e.g., scraping shipping carrier websites for up-to-date service level requirements, etc.), and/or any other suitable entity. The data requests preferably include requests for service level requirements, but can additionally or alternatively include requests for tracking information (e.g., associated with a shipment), rate quotes, and/or any other relevant types of information. Aggregating requests for different types of information can improve computational processing efficiency and/or network functionality such as in a networking including a SAS and a plurality of shipping carriers.

In a variation, Block S210 can include transforming a data request based on carrier-specific rules (e.g., API request format rules, data retrieval rules such as data limits, etc.). In an example, Block S210 can include: generating a data request for weight requirements for service levels provided by a first shipping carrier and a second shipping carrier; transforming the data request into a first shipping carrier-specific request based on a first API request format rule tailored to the API of the first shipping carrier; and transforming the data request into a second shipping carrier-specific request based on a second API request format rule. In another example, carrier-specific rules can include rules for including one or more API keys (e.g., stored by the SAS for accessing shipping carrier platforms corresponding to the API keys, etc.) with data requests.

Block S210 can be performed at predetermined time intervals (e.g., updating the service level requirements on a weekly basis based on sending new queries to the shipping carriers every week, etc.), in response to a trigger event (e.g., receiving an object dataset S230, determining object characteristics S230, etc.) and/or at any suitable frequency or time in any suitable temporal relationship to other portions of the method 200. In a variation, Block S210 is performed at different frequencies for different shipping carriers. For example, Block S210 can include querying a first shipping carrier at a first time interval (e.g., weekly) based on data limit requirements for the first shipping carrier API; and querying a second shipping carrier at a second time interval based on data limit requirements for the second shipping carrier API. Block S210 can additionally or alternatively be performed in any manner analogous to that described in U.S. patent application Ser. No. 14/481,078, filed 9 Sep. 2014, the entirety of which is incorporated by this reference. However, Block S210 can be performed in any suitable manner.

4.2 Method—Determining Object Characteristic Requirements.

Block S220 recites: determining object characteristic requirements for the service levels based on processing the service level requirements. Block S220 functions to process (e.g., standardize, normalize, filter, convert, etc.) the service level requirements into a form suitable for comparison with object characteristics for an object to be shipped. Object characteristic requirements preferably include conditioned service level requirements (e.g., standardized object requirements, standardized insurance requirements) in a form suitable for downstream comparison to object characteristics, but can include raw service level requirements and/or any other suitable data.

Regarding Block S220, determining object characteristic requirements is preferably based on processing one or more service level requirements according to a computer-implemented rule (e.g., a compatibility rule, a user preference rule), but object characteristic requirements can be determined based on any suitable information. In a variation, Block S220 includes applying a compatibility rule. In this variation, Block S220 preferably includes applying a compatibility rule in standardizing object characteristic requirements of a given type (e.g., dimensions) across service levels requiring the given type of requirement. For example, Block S220 can include: for each service level including dimensions requirements and weight requirements, converting the dimensions requirements into a shared distance unit (e.g., inches), and converting the weight requirements into a shared weight unit (e.g., ounces). In another example, Block S220 can include employing natural language processing to standardize object type requirements for different service levels. In a specific example, Block S220 can include: receiving, from a first shipping carrier, a service level requirement specifying that "Lithium Batteries" require a first service level; receiving, from a second shipping carrier, a service level requirement specifying that "Lithium Cells" require a second service level; determining that "Lithium Batteries" and "Lithium Cells" share a similar meaning; and standardizing "Lithium Batteries" and "Lithium Cells" to a "Hazardous Power Sources" object type requirement stored in associated with the first and second service levels. Additionally or alternatively, applying a compatibility rule can include standardizing an object characteristic requirement for a service level to the format preferred by the shipping carrier providing the service level, by an associated party (e.g., by a shipping recipient, by an associated manufacturer, by an associated distributor, etc.), and/or other suitable entity. For example, for a service level requirement specifying a required weight in pounds, Block S220 can include converting the required weight into a unit type (e.g., ounces) required by an API of the shipping carrier providing the service level. However, applying a compatibility rule can be performed in any suitable manner.

In another variation, Block S220 can include applying a user preference rule. For example, Block S220 can include determining object characteristic requirements only for service levels satisfying user criteria (e.g., mode of transportation criteria, rate quote criteria) specified by user preference rules. In this example, comparing object characteristics and object characteristic requirements (e.g., in Block S250) can exclude comparisons with requirements for service levels not satisfying the user criteria (e.g., to omit unnecessary computational operations that would undermine computational processing efficiency).

Block S220 is preferably performed in response to receiving service level requirements in Block S210, but can be performed in response to a different trigger event (e.g., in response to reaching a data amount threshold for service level requirement data), at a predetermined time interval and/or at any suitable time or frequency. In an example, Block S220 can be performed at different frequencies for different shipping carriers (e.g., based on different data retrieval rules for different shipping carriers, etc.), and/or varied for any suitable purpose.

Regarding Block S220, different service levels can be associated with different types of object characteristic requirements. For example, a first service level provided by a first shipping carrier can include dimensions requirements and weight requirements, and a second service level provided by a second shipping carrier can include an object type requirement (e.g., requiring durable, non-fragile, objects). However, any number and/or types of object characteristic requirements can be determined for and/or stored in association with any suitable number of service levels provided by any suitable number of shipping carriers. However, determining object characteristic requirements can be performed in any suitable manner.

4.3 Method—Receiving Object Datasets.

Block S230 recites: receiving a dimensions dataset from an ODM and a weight dataset from an OWM. Block S230 functions to receive one or more object datasets used in downstream processing to determine object characteristics for determining a viable service level. Block S230 can additionally or alternatively include actively collecting (e.g., sampling) and/or transmitting (e.g., wirelessly with a wireless communication module) object datasets (e.g., dimensions datasets, weight datasets) with an ODM, OWM, and/or any other suitable device.

Block S230 preferably includes receiving a dimensions dataset and/or a weight dataset, but can additionally or alternatively include receiving other object datasets including any one or more of: user device datasets collected by a user device (e.g., user device sensors such as optical sensors, radar sensors, etc.) and indicative of object characteristics, object type datasets, object metadata datasets (e.g., indicative of reviews, related objects, warranty, manufacturer, origin, age), an identifier dataset (e.g., indicative of an object identifier such as object model number), object material datasets indicative of materials used in constructing the object (e.g., constructed with metal, glass, fragile materials, durable materials, etc.), technical specifications, and/or any other suitable object datasets indicative of object characteristics. Object datasets can be represented by any suitable units.

Regarding Block S230, object data is preferably received at a SAS (e.g., a remote computing system associated with a shipping services platform, etc.) but can be received at any suitable component. Object datasets are preferably received from an ODM and/or OWM, but can additionally or alternatively be received from one or more of: a user device (e.g., sensor dataset from the user device such as an image dataset, radar dataset, etc.), an API (e.g., a user using the AP to transmit the object data), databases (e.g., a manufacturer database, distribution center database, database including characteristic object data and/or characteristics associated with object types, etc.), Internet resources (e.g., scraping product websites for object data for a given object type), and/or any other suitable component. In an example, the method 200 can include transmitting object dimensions data from an ODM to a user device; and receiving the object dimensions data at a remote SAS from the user device.

Regarding Block S230, object data can be received in any suitable amount, at any suitable frequency, and at any suitable time. For example, Block S230 can include receiving individual object data (e.g., on a per-dimension basis such as receiving a height measurement first, and receiving a length measurement second as a user progresses in using an ODM to take measurements), and/or receiving aggregate object data (e.g., a set of dimensions for an object, multiple dimensions for multiple objects, etc.), and/or in any suitable manner. In another example, Block S230 can include concurrently receiving a plurality of object datasets for multiple objects from a plurality of devices (e.g., ODMs and OWMs) associated with multiple users. In this example, Block S230 can include associating (e.g., with the SAS) object datasets to their respective object (e.g., to an object identifier) and the corresponding user (e.g., to a user identifier). Such associations can be based on an application identifier identifying an application executing on the user device from which the object dataset is received, a user identifier (e.g., user account credentials) associated with the application and/or the device collecting the object dataset (e.g., where the device has been registered with the user account, etc.), and/or any other suitable mechanism of identifying the association between object datasets, objects, users, and/or other suitable entities. However, receiving an object dataset S230 can be performed in any suitable manner.

4.4 Method—Determining Object Characteristics.

Block S240 recites: determining object characteristics for the object based on processing the dimensions dataset and the weight dataset. Block S240 functions to process object data to determine object characteristics characterizing the object, which can be used downstream in determining a service level for shipping the object. As shown in FIG. 8, Block S240 can additionally or alternatively include determining an object type for the object S242. Regarding Block S240, object characteristics preferably include conditioned object datasets (e.g., standardized object dimensions derived from a dimensions dataset, standardized object weight, etc.) in a form suitable for downstream comparison to object characteristic requirements, but can include raw object datasets and/or any other suitable data. Object characteristics can include any one or more of: dimensions characteristics (e.g., length, width, height, curvature, etc.), weight characteristics, density characteristics, object type (e.g., furniture, bags, containers, etc.), object materials, an identifier, object materials, object metadata, technical specifications, 3D models, and/or any other suitable object characteristics. Object characteristics can be represented in any suitable units. For example, object dimensions can be represented in metric system units, imperial system units, and/or any suitable units.

Regarding Block S240, determining object characteristics is preferably based on processing one or more object datasets according to a computer-implemented rule (e.g., a compatibility rule, a user preference rule), but object characteristics can be determined based on any suitable information. Computer-implemented rules applied in accordance with Block S240 are preferably the same computer-implemented rules applied in accordance with Block S220, such that Block S240 can include applying computer-implemented rules to determine object characteristics in a manner analogous to applying the computer-implemented rules to determine object characteristic requirements. By consistently applying the same computer-implemented rules in generating both the object characteristic requirements and the object characteristics, the method 200 can enable the generation of standardized object characteristic requirements and object characteristics for meaningful comparison in determining viable service levels. For example, the method 200 can include, applying a unit standardization compatibility rule to convert dimensions requirements for service levels into units of inches; and applying the same rule to convert object dimensions into units of inches. Additionally or alternatively, computer-implemented rules used in Block S220 can be applied in a different manner in Block S240, and/or different computer-implemented rules can be used for Block S240 than for Block S220. In an example, the method 200 can include receiving a user preference specifying for objects to be shipping only with a first or a second shipping carrier (e.g., UPS or USPS); determining object characteristic requirements (e.g., dimensions in meters, weight in pounds) for the shipping carriers; and converting, based on a compatibility rule and the user preference, a dimensions dataset and a weight dataset for an object into dimensions characteristics and weight characteristics with unit types matching the unit types of the object characteristic requirements. However, applying computer-implemented rules in relation to Block S240 can be performed in any suitable manner.

Block S240 is preferably performed in response to receiving one or more object datasets in Block S210, but can be performed in response to a different trigger event (e.g., in response to reaching data amount threshold for object characteristics, in response to associating object characteristics with an object identifier and/or user identifier, etc.), at a predetermined time interval, and/or at any suitable time or frequency. In an example, Block S240 can be performed at different frequencies for different devices collecting object datasets, for different users, and/or varied for any suitable purpose.

Block S240 can additionally or alternatively include determining an object type for the object S242. Block S242 functions to classify the object with one or more descriptive object types, which can be used in determining a service level (e.g., in Block S250), and/or any other suitable information (e.g., shipping materials in Block S260, shipping label in Block S270, customs information in Block S280, etc.). Object types preferably include categories grouping together different classes of objects based on similarities in purpose (e.g., grouping watches and clocks), dimensions (e.g., grouping objects under 2 cubic inches), weight (e.g., grouping objects within 16 oz and 32 oz), object materials (e.g., grouping fragile objects), object metadata (e.g., grouping objects from the same manufacturer), technical specifications, and/or any other suitable criteria. However, object types can group object classes in any suitable manner, and object types can be defined in any suitable manner.

Determining an object type S240 is preferably based on dimensions characteristics and/or weight characteristics, but can additionally or alternatively be based on any suitable object characteristics (e.g., an image dataset for the object). Determining an object type is preferably performed with an object classification model including any one or more of: probabilistic properties, heuristic properties, deterministic properties, and/or any other suitable properties. In examples, Block S242 can be performed with one or more machine learning algorithms, such as those described below in relation to Block S250. In a specific example, Block S252 can include applying a k-nearest neighbors algorithm to determine the types of objects with the most similar dimensions and weights (e.g., average dimensions, average weights, etc.) as the object being classified. In another specific example, Block S252 can include applying a neural network model (e.g., a convolutional neural network model), where classifying a physical object can include inputting an image dataset (e.g., pixel values) and object characteristics (e.g., dimensions characteristics, weight characteristics) into the neural input layer of the neural network model. Object classification models are preferably updated (e.g., subsequent to determining a service level for an object) with object characteristics (e.g., derived based on ODM and OWM data, etc.) and a corresponding object type label (e.g., received from a user, from the shipping carrier, etc.). Additionally or alternatively, determining an object type S242 can be performed in any suitable manner. However, determining object characteristics for the object can be performed in any suitable manner.

4.5 Method—Determining a Service Level.

Block S250 recites: determining a service level for the physical object based on a comparison between the object characteristics and the object characteristic requirements. Block S250 functions to determine viable service levels (e.g., based on satisfying object characteristic requirements for the service level, based on user preferences, etc.) for shipping an object, such as determining that UPS Ground is the cheapest service level available for shipping an object with certain object characteristics. Block S250 can include one or more of: determining quotes (e.g., rate quotes, insurance quotes) S252; ranking service levels S254; purchasing a service level S256; presenting the service level S258; and/or any other suitable functionality.

Block S250 preferably includes automatically determining a service level (e.g., without requiring user action), but can alternatively include determining a service level based on a user selection of a service level (e.g., out of a plurality of identified service levels presented to a user). Automatic determination of a service level can enable shipping logistics to be coordinated without direct communication with the shipping sender. Determining a service level S250 is preferably based on object characteristics and object characteristic requirements. For example, Block S250 can include comparing dimensions characteristics and weight characteristics for an object to different dimensions characteristic requirements and weight characteristic requirements for each of a plurality of service levels associated with a plurality of shipping carriers. In a specific example, Block S250 can include comparing a weight characteristic of 25.6 lbs. for an object to a first service level requiring objects less than 25 lbs. and a second service level requiring objects less than 30 lbs.; and selecting the second service level based on the object characteristic satisfying the object characteristic requirement. In another specific example, Block S250 can include determining a drone delivery service from a set of drone delivery services based on comparing the object characteristics (e.g., standardized dimensions characteristics and weight characteristics, etc.) to drone delivery dimensions requirements and drone delivery weight requirements specified by the set of drone delivery services. In another specific example, the method 200 can include: determining object characteristic requirements based on generating 3D packaging models associated with the service levels; determining standardized object characteristics based on generating a 3D model of the physical object; and determining the service level based on comparing the 3D packaging models with the 3D model.

In a variation of Block S250, determining a service level can be based on one or more shipment options. A shipment option preferably specifies different options that affect the determination of a service level and/or associated information (e.g., rate quote). Shipment options can be shipping carrier-specific or shipping carrier-independent. Shipment options can include any one or more of: additional handling (e.g., requiring an additional handling charge for metal or wood shipping package, for objects not fully encased in a corrugated cardboard shipping package, for shipping packages with particular dimensions), particular object type (e.g., alcohol, dry ice, hazardous materials, fragile materials, etc.), postage options (e.g., account number of postage purchaser), delivery confirmation, freight charges, customs options, scheduled delivery (e.g., Saturday delivery), and/or any other suitable shipping options. Shipment options are preferably automatically determined (e.g., by the SAS based on object characteristics). In an example, the method 200 can include, determining an object type of alcohol (e.g., in Block S240); and determining service levels associated with shipment options allowing alcohol shipments. Additionally or alternatively, shipment options can be manually determined (e.g., input by a user through an API). However, determining service levels based on shipment options can be performed in any suitable manner.

In another variation of Block S250, determining a service level can be based on a user preference. User preferences can be for any one or more of: service level characteristics (e.g., rate quotes, delivery speed, mode of transportation, associated shipping carrier, etc.), shipment options, and/or any other suitable component. User preferences can be automatically determined (e.g., identifying a rate quote user preference based on a trend that the user historically selects the service level with the lowest rate quote; determining user preferences based on previously identified user preferences), manually determined (e.g., selected by a user through a web application; determined after prompting a user to select from different possible service levels; etc.) For example, Block S250 can include receiving a user preference for delivery speeds (e.g., same day shipping) when shipping objects with defined object characteristics (e.g., objects with weights above 20 lbs); and identifying service levels satisfying the user preference and allowing shipment of objects possessing the defined object characteristics. In another example, the user preference can specify that all shipments to a particular location (e.g., a zip code) are required to be shipped with a predetermined service level (e.g., UPS Ground). However, determining service levels based on user preferences can be performed in any suitable manner. Further, determining service levels can be based on any suitable information.

In relation to Block S250, determining a service level can be performed with one or more service level determination models including any one or more of: probabilistic properties, heuristic properties, deterministic properties, and/or any other suitable properties. In examples, Block S250 and/or other portions of the method 200 can employ machine learning approaches including any one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm.

Regarding Block S250, features used in a service level determination model can include and/or be derived from any one or more of: object characteristics, object characteristic requirements, service level-related information, engineered features (e.g., combinations of values for different object characteristic types), historical delivery data (e.g., historical delivery speeds and/or delivery success rates for a given service level for a given set of dimensions characteristics and weight characteristics), and/or any other suitable data. In variations, service level determination models and/or other suitable models can be analogous to those described in U.S. patent application Ser. No. 14/481,078, filed on 9 Sep. 2014, which is herein incorporated in its entirety by this reference.

In relation to Block S250, any number of service levels can be determined for any number of users. In examples, different service levels (e.g., associated with different shipping carriers) can be determined for different objects (e.g., based on different object characteristics for the different objects), different batches, and/or otherwise varied. In a specific example, the method 200 can include determining a first service level for a first physical object of a first user; receiving, for a second physical object of a second user, a dimensions dataset from an ODM (e.g., a second ODM associated with the second user) and a weight dataset from an OWM (e.g., a second OWM); determining standardized object characteristics for the second physical object based on the dimensions dataset and the weight dataset according to the compatibility rule (e.g., where the same compatibility rule was used to standardize the dimensions and weight datasets for the first physical object); and determining a second service level from the service levels for the second physical object based on a comparison between the second standardized object characteristics and the object characteristic requirements, where the first and the second service levels are provided by different shipping carriers of the plurality of shipping carriers. In other examples, different service levels can be determined for two objects with the same or substantially similar object characteristics, such as in situations where the two objects are associated with different users having different user preferences (e.g., a first user preferring cheapest rate quote, and a second user preferring fastest available delivery).

Regarding Block S250, a service level can be determined for any number of objects. For example, determining a service level can include batching a plurality of objects into a shipment batch; and determining a service level for the shipment batch based on the object characteristics for the plurality of objects (e.g., combined dimensions which can be determined based on a plurality of positional configurations for packaging the plurality of objects together; combined weight; etc.). In a specific example, the method 200 can include receiving an additional dimensions dataset for a plurality of additional objects from the ODM; determining a first shipment batch comprising the object and a first subset of the plurality of additional objects based on a first comparison (e.g., between the dimensions dataset for the object and the dimensions requirements) and a second comparison (e.g., between the additional dimensions dataset and the dimensions requirements); and determining a second shipment batch including a second subset of the plurality of additional objects based on the second comparison.

In relation to Block S250, data used in determining service levels is preferably stored by and retrieved from a database of the SAS, but can additionally or alternatively be retrieved from a third party database (e.g., a manufacturer database). For example, a delivery estimate associated with a service level can be determined from an estimate provided by a shipping carrier (e.g., retrieved through the API of the shipping carrier), and/or from analyzing historical delivery speeds for the service level collected over time by the SAS (e.g., which can more accurately reflect actual delivery speeds). For example, delaying a delivery estimate can be based on identifying an unexpectedly high amount of delivery volume for specific locations, for specific shipping carriers, overall, and/or along any suitable vector. However, any suitable data obtained from any suitable source can be used in determining one or more service levels.

Block S250 is preferably performed for an object in response to determining object characteristics for the object in Block S240. In an example, Block S250 can apply a service level determination rule specifying that service levels are determined in response to determining a threshold amount and/or types of object characteristics (e.g., determining a service level in response to determining both dimensions characteristics and weight characteristics for an object). However, Block S250 can be performed in response to other trigger events (e.g., a user requesting service levels for an object through an API), at any suitable frequency, and at any suitable time.

Determining a service level S250 can additionally or alternatively include determining rate quotes (e.g., the price for purchasing the service level), insurance quotes (e.g., from insurers, from shipping carriers, from a plurality of sources, etc.), and/or other suitable data relevant to shipping a particular object with the service level S252. Block S252 functions to determine service level-related information for presentation to a user and/or automatic determination of a service level. The rate quotes and/or insurance quotes are preferably determined based on the service level, origin address, destination address, shipment options, object type, object value, and/or other suitable data. Rate quotes are preferable requested (e.g., via a shipping carrier API, via a shipping services platform API, etc.) and determined for each service level (e.g., spanning multiple shipping carriers). Insurance quotes can be determined for any number of insurers. However, determining rate quotes and/or insurance quotes can be performed in any suitable manner.

Determining a service level S250 can additionally or alternatively include ranking service levels S254, which can be based on any one or more of: comparisons between object characteristics and object characteristic requirements, service level characteristics, shipment options, and/or any other suitable criteria. Block S254 functions to prioritize service levels for selection. In an example, ranking service levels can be based on historical delivery speed data for each service level for historical objects with similar dimensions characteristics, weight characteristics, and/or other object characteristics. In another example, ranking service levels can be based on rate quotes for the service levels (e.g., ranked from lowest rate quote to highest quote). Additionally or alternatively, ranking service levels can be performed in any manner analogous (e.g., with respect to shipping scores) to that described in U.S. patent application Ser. No. 14/481,078, filed 9 Sep. 2014, the entirety of which is incorporated by this reference. However, ranking service levels can be performed in any suitable manner.

Determining a service level S250 can additionally or alternatively include automatically purchasing a determined service level S256. Block S256 functions to automate transaction processing for a service level. Purchasing a service level preferably includes generating and/or transmitting a purchase request for the service level to the shipping carrier (e.g., through an API of the shipping carrier) providing the service level. Purchasing is preferably handled by a shipping services platform associated with the shipping automation system, but can additionally or alternatively be handled by the shipping carrier providing the service level, and/or any other suitable entity. Carrier-specific information (e.g., shipping label information, tracking information, etc.) is preferably received in response to fulfillment of the purchase request. Carrier-specific information can be processed (e.g., automatically generating a shipping label), transmitted (e.g., to the user at a user device), and/or otherwise used. The purchased service level is preferably a service level determined in Block S250 and/or selected by a user after presenting service levels determined in Block S250, but can additionally or alternatively be any suitable service level. However, automatically purchasing service levels can be performed in any suitable manner.

Determining a service level S250 can additionally or alternatively include presenting the determined service level to a user S258. Block S258 functions to inform the user of identified and/or purchased service levels. Any suitable service level-related information (e.g., requirements, delivery speed, rate quote, associated shipping carrier, different service levels for a user to select from, etc.) can be presented. In an example, different service levels can be presented in conjunction with recommendations (e.g., recommending a service level based on a historically high delivery success rate). However, presenting a service level can be performed in any suitable manner.

4.6 Method—Determining Shipping Materials.

The method 200 can additionally or alternatively include determining shipping materials based on object characteristics S260, which functions to identify appropriate materials for packaging and shipping an object. For example, Block S260 can include identifying, with the SAS, a cardboard box with dimensions suitable for encasing an object based on the object's dimensions. Given that the choice of shipping supplies affects the shipping dimensions as well as the shipping weight, identified shipping materials can be used in determining service levels (e.g., in Block S250), thereby improving upon costs and shipping logistics. Shipping materials can include any one or more of: containers (e.g., cardboard boxes, metal containers, etc.), object padding (e.g., bubble wrap, packing peanuts, etc.), adhesives (e.g., tape, glue, etc.), and/or any other suitable materials relevant to packaging and/or shipping an object.

Determining shipping materials S260 is preferably based on object characteristics (e.g., dimensions characteristics, weight characteristics, object type, etc.) of the object, but can additionally or alternatively be based on one or more of: user preferences, service level-related information, shipping materials supplier availability, and/or any other suitable information. Shipping materials can be identified from any one or more of: databases specifying shipping materials and associated shipping materials characteristics (e.g., type of material, dimensions, weight, etc.) available from one or more shipping materials suppliers, Internet (e.g., scraping shipping materials availability from online merchants), shipping carrier platforms, shipping services platforms, and/or any other suitable entity. In an example, the SAS can include an inventory of shipping materials that can be purchased and/or delivered to a user; and/or a database detailing the inventory of the SAS (e.g., boxes available to the user such as already-owned or accessible boxes, which can be selected by a user for use in shipping an object). Additionally or alternatively, the ACM 130 can maintain a list of common box sizes, or can allow a user to manually enter box sizes and/or user preferences for selecting shipping materials.

In relation to Block S260, any number of shipping materials can be determined for one or more objects and/or shipments. For example, if more than one shipping materials configuration is available for the object (e.g., multiple boxes can fit the object), Block S260 can include calculating quotes for multiple shipping materials configurations (e.g., to present to a user; to determine a ranking based on shipping cost, shipment speed, etc.). However, determining shipping materials can be performed in any suitable manner.

4.7 Method—Processing a Shipping Label.

As shown in FIG. 9, the method 200 can additionally or alternatively include processing a shipping label S270, which functions to prepare and/or print a shipping label based on one or more service levels determined in Block S260. Processing a shipping label S270 can additionally or alternatively include: determining shipping label information for populating information boxes of a shipping label, automatically generating a shipping label (e.g., by filling in carrier-specific information into a shipping label template applicable across a plurality of shipping carriers), transmitting a shipping label (e.g., from an SAS to a label printer system, from an SAS to a user device, etc.), printing a shipping label (e.g., with a label printer system), and/or any other suitable functionality. Shipping label information can include origin address, destination address, service level-related information, tracking information, and/or any other suitable information. As shown in FIG. 9, in an example, the shipping label can include an automatic delivery code operable to cause (e.g., when scanned) a delivery vehicle to automatically deliver the object. In a specific example, the shipping label can include an automatic delivery code encoding a destination address and dimensions characteristics derived from the dimensions dataset, where the method 200 can further include: scanning the automatic delivery code with a delivery drone; and automatically delivering the object with the delivery drone based on the destination address and the dimensions characteristics.

Processing a shipping label S270 is preferably performed by a label printer system, but portions of Block S270 can additionally or alternatively be performed by the SAS, a user device, and/or any other suitable component. In a specific example, the method 200 can include receiving an object dataset (e.g., from an ODM) at a label printer system; transmitting the object dataset to the SAS (e.g., a remote computing system; a processor of the label printer system; etc.); generating, at the SAS, a comparison between the object dataset and object characteristic requirements for service levels; purchasing, at the SAS, a service level based on the comparison; automatically generating a shipping label based on the service level; and in response to automatically generating the shipping label, printing the shipping label with the label printer system.

In relation to Block S270, label printer systems used in processing a shipping label are preferably associated with a user identifier (e.g., identifying a user account). For example, the method 200 can include prompting, at a display of the label printer system, the user to collect an object dataset (e.g., collect a dimensions dataset with the ODM); in response to receiving the dimensions dataset, associating the dimensions dataset with the user identifier associated with the label printer system, where determining and/or purchasing the service level can be further based on user preferences associated with the user identifier. Block S270 can include processing any number of shipping labels for any number of objects, shipments, batches (e.g., printing a first and a second shipping label for a first and a second shipment batch, where the first and the second shipping labels are associated with different shipping carriers), and/or other components. However, processing a shipping label can be performed in any suitable manner.

4.8 Method—Determining Customs Information.

The method 200 can additionally or alternatively include determining customs information S280, which functions to determine the information necessary for generating customs forms required for international shipping. Customs information can include any one or more of: content type, content explanation, customs certification, customs signer, restriction types, and/or any other suitable information. Determining customs information is preferably automatic (e.g., determining content type based on object types determined in Block S240 for the object), but can be manual (e.g., entered by a user through an API), and/or otherwise determined. Block S280 preferably includes automatically generating customs forms based on the customs information, which can include populating a shipping label with the customs information. However, determining customs information can be performed in any suitable manner.

4.9 Method—Delivering an Object.

As shown in FIG. 9, the method 200 can additionally or alternatively include delivering the object S290, which functions to deliver the object using a service level determined in Block S250. The object is preferably delivered by a delivery vehicle specified by the service level, but can additionally or alternatively be delivered using any suitable vehicle. Block S290 is preferably performed in response to finalizing a service level (e.g., as in Block S250), but can be performed in response to other trigger events (e.g., scanning an automatic delivery code included in a shipping label; purchasing a service level; finalizing a batch for shipping a plurality of objects; user input; and/or other suitable trigger events), at a predetermined interval (e.g., based on a delivery schedule), and/or at any suitable time. However, delivering the object can be performed in any suitable manner.

4.10 Method—Generating Shipment-Related Data Structures.

As shown in FIG. 6, the method 200 can additionally or alternatively include generating shipment-related data structures S295, which functions to generate data structures usable in an API and/or other interface for automating and/or performing suitable portions of the method 200. Shipment-related data structures can include any one or more of: identifiers identifying one or more tangible entities (e.g., objects, users, user devices, etc.) or intangible entities (e.g., shipments, trackers, etc.), parcel data structures (e.g., representing one or more objects to be shipped; representing a packaged object to be shipped; etc.), shipment data structures (e.g., representing a shipment operation), user preferences, computer-implemented rules, data structures representing object characteristics and/or service level-related information, and/or any other suitable data structures. Types of identifiers can include anyone one or more of: an object identifier (e.g., identifying an object being shipped), a parcel identifier (e.g., identifying a physical container in which the object will be shipped), a shipment identifier (e.g., identifying a shipment), a batch identifier (e.g., identifying a batch of shipments), a tracker identifier (e.g., identifying tracking information for a shipment), a report identifier (e.g., identifying a report with shipment data, object data, etc.), a user identifier (e.g., account information), a customs identifier (e.g., identifying customs information for international shipping), and/or any other suitable identifier types.

Regarding Block S295, any suitable associations can be established between any suitable shipment-related data structures. Further, shipment-related data structures preferably facilitate computational automation of service level determination (e.g., in Block S250). For example, the method 200 can include: in response to determining (e.g., standardizing) object characteristics for an object, generating a parcel data structure including the object characteristics and an object identifier identifying the object, where determining a service level includes retrieving the object characteristics based on the parcel data structure. In this example, the method 200 can additionally or alternatively include: generating a shipment data structure comprising the parcel data structure and a destination address, and where determining the service level includes generating a rate quote for the service level based on the shipment data structure, and where determining the service level is further based on the rate quote. Further, in this example, the method 200 can additionally or alternatively include: associating the shipment data structure with a user identifier identifying the user; and retrieving user preferences associated with user based on the user identifier, where determining the service level is further based on the user preferences. However, generating shipment-related data structures can be performed in any suitable manner.

Any portions of the method 200 and/or instances of a portion of the method 200 can be performed in serial (e.g., in response to, etc.), parallel (e.g., concurrently on different threads for parallel computing to improve system processing ability for determining service levels, etc.), and/or with any suitable temporal relationship.

An alternative embodiment preferably implements the above methods in a computer-readable medium storing computer-readable instructions. The instructions are preferably executed by computer-executable components preferably integrated with a shipping services platform. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

The embodiments include every combination and permutation of the various system components and the various method processes, including any variations, examples, and specific examples.

As a person skilled in the art will recognize from the previous detailed description and from the figures and claims, modifications and changes can be made to the preferred embodiments of the invention without departing from the scope of this invention defined in the following claims.

We claim:

1. A method, comprising:
   receiving an object characteristic dataset for an object from an object characteristic measurer (OCM);
   comparing the object characteristic dataset to a set of object characteristic requirements for service levels provided by a plurality of shipping carriers;

querying the plurality of shipping carriers for the set of object characteristic requirements for each respective service level in near-real time; and determining a service level from the service levels based on the comparison, wherein a shipping label is generated based on the service level.

2. The method of claim 1, wherein the object characteristic measurer comprises a camera and a wireless communications module.

3. The method of claim 1, further comprising classifying the object based on measurements from the object characteristic measurer.

4. The method of claim 1, wherein the object characteristic dataset is determined based on imagery from the object characteristic measurer.

5. The method of claim 4, wherein the object characteristic dataset comprises a dimensions dataset, wherein the object characteristic measurer prompts a user to take multiple images of the object from varying views.

6. The method of claim 1, wherein the object characteristic measurer comprises a personal user device.

7. The method of claim 1, wherein querying the plurality of shipping carriers for the set of object characteristic requirements for each respective service level comprises sending an API request to an API for each shipping carrier.

8. The method of claim 1, wherein the object characteristic measurer comprises at least one of an object dimensions measurer (ODM) or an object weight measurer (OWM).

9. The method of claim 1, further comprising estimating a weight characteristic for the object from the object characteristic dataset, wherein the object characteristic dataset comprises an image dataset and wherein the weight characteristic is not estimated based on a measured weight of the item.

10. The method of claim 1 wherein querying the plurality of shipping carriers for the set of object characteristic requirements for each respective service level comprises sending data requests to each of the shipping carriers based on rules associated with the respective shipping carrier.

11. The method of claim 1, wherein determining the service level further comprises ranking service levels based on rate quotes for the service levels provided by the plurality of shipping carriers.

12. The method of claim 1, wherein determining the service level further comprises, at a user device, displaying the service levels and prompting the user to select a service level.

13. A system comprising:
an application executable on an object characteristic measurer, configured to:
receive an object characteristic dataset for the object from the object characteristic measurer;
determine an object classification based on measurements sampled by the object characteristic measurer using a neural network model; and
receive a selection of a service level from a set of viable service levels, wherein the set of viable service levels are determined by obtaining a set of object characteristic requirements for a set of service levels provided by a plurality of shipping carriers, and determining the set of viable service levels based on the object classification and a comparison between the object characteristic dataset and the object characteristic requirements for each service level of the set;
wherein the object is shipped according to requirements of the selected service level.

14. The system of claim 13, wherein the system is further configured to query the plurality of shipping carriers for the object characteristic requirements corresponding to the set of service levels provided by the plurality of shipping carriers using a set of shipping carrier-specific data requests, determined based on a set of shipping carrier data request format rules.

15. The system of claim 13, wherein the application is further configured to control a printer to print a shipping label, wherein the shipping label is attached to the object.

16. The system of claim 13, wherein classifying the object comprises inputting the object characteristic dataset into a neural input layer of the neural network model.

17. The system of claim 13, wherein the object characteristic measurer comprises a smartphone.

18. The system of claim 13, wherein the set of measurements comprise a set of images sampled from different angles, wherein the object characteristic dataset is determined based on the set of images.

19. The system of claim 13, wherein selecting the service level further comprises ranking the service levels based on historical delivery speed data for each service level for historical objects with similar object characteristics as the object.

* * * * *